(12) United States Patent
Venkataramanachari et al.

(10) Patent No.: US 10,582,387 B2
(45) Date of Patent: *Mar. 3, 2020

(54) DISABLING A MOBILE DEVICE THAT HAS STOLEN HARDWARE COMPONENTS

(71) Applicant: International Business Machines Corporation, Armonk, NY (US)

(72) Inventors: Yethish G. Venkataramanachari, Kolar Gold Fields (IN); Jayashree S. Kumar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/797,850

(22) Filed: Oct. 30, 2017

(65) Prior Publication Data

US 2018/0049034 A1 Feb. 15, 2018

Related U.S. Application Data

(63) Continuation of application No. 15/072,600, filed on Mar. 17, 2016, now Pat. No. 9,807,615.

(51) Int. Cl.
| | |
|---|---|
| *H04W 12/08* | (2009.01) |
| *H04W 12/06* | (2009.01) |
| *H04W 12/12* | (2009.01) |
| *H04W 12/00* | (2009.01) |

(52) U.S. Cl.
CPC .......... *H04W 12/08* (2013.01); *H04W 12/06* (2013.01); *H04W 12/0802* (2019.01); *H04W 12/1206* (2019.01); *H04W 12/00512* (2019.01)

(58) Field of Classification Search
CPC ...... H04W 12/06; H04W 12/08; H04W 12/12

USPC .......................................... 455/414; 342/411
See application file for complete search history.

(56) References Cited

U.S. PATENT DOCUMENTS

| | | | |
|---|---|---|---|
| 6,925,562 B2 | 8/2005 | Gulcu et al. | |
| 7,355,506 B2 | 4/2008 | Chandley | |
| 8,248,237 B2 | 8/2012 | Fitzgerald et al. | |
| 9,258,715 B2 | 2/2016 | Borghei | |
| 2004/0204003 A1 | 10/2004 | Soerensen et al. | |

(Continued)

OTHER PUBLICATIONS

Costello, "How to Use Find my iPhone to Find a Lost/Stolen iPhone," iPhone/iPod Expert, last updated Nov. 2, 2015, last printed on Dec. 10, 2015, 5 pages. http://ipod.about.com/od/usingios4/ht/Use-Find-My-Iphone-To-Locate-Lost-Or-Stolen-Iphone.htm.

(Continued)

*Primary Examiner* — Timothy X Pham
(74) *Attorney, Agent, or Firm* — Nathan M. Rau

(57) ABSTRACT

A first hardware component identifier may be read for a first hardware component of a computing device. The reading of the first hardware component identifier for the first hardware component may be performed by a processor of the computing device reading a read-only memory of the first hardware component. A second hardware component identifier and an alert indicator over a network may be received. The second hardware component identifier and the alert indicator may correspond with the first hardware component. The first hardware component identifier may be compared with the second hardware component identifier. The computing device may be disabled when the first hardware component identifier matches the second hardware component identifier and the alert indicator indicates that the first hardware component has been reported stolen.

20 Claims, 8 Drawing Sheets

(56) References Cited

U.S. PATENT DOCUMENTS

| | | |
|---|---|---|
| 2007/0173229 A1 | 7/2007 | Dong et al. |
| 2009/0260089 A1 | 10/2009 | Chang et al. |
| 2012/0083292 A1 | 4/2012 | Yeo et al. |
| 2013/0097694 A1 | 4/2013 | Dang et al. |
| 2013/0263290 A1 | 10/2013 | Xu |
| 2014/0372743 A1 | 12/2014 | Rogers et al. |
| 2015/0230108 A1 | 8/2015 | Sridhara et al. |
| 2015/0372825 A1 | 12/2015 | Park et al. |

OTHER PUBLICATIONS

Osman, "Generating Unique Key (Finger Print) for a Computer for Licensing Purposes," Code Project, Jan. 24, 2011, 6 pages. http://www.codeproject.com/Articles/28678/Generating-Unique-Key-Finger-Print-for-a-Computer.

Unknown, "Phone Theft in America," Lookout, Inc., printed Dec. 10, 2015, 11 pages. https://www.lookout.com/resources/reports/phone-theft-in-america.

Unknown, "Quickly find CPU, BIOS and Motherboard information using WMI," TechAbly, last updated Oct. 19, 2011, printed on Dec. 10, 2015, 2 pages. http://techably.com/quick-find-cpu-motherboard-bios-information/3286/.

Wagenseil, "Smartphone Kill Switch: What It Is, How It Might Work," May 14, 2014, 10:40 AM, 8 pages. tomsguide.com.

Venkataramanachari et al., "Disabling a Mobil Device That Has Stolen Hardware Components," U.S. Appl. No. 15/072,600, filed Mar. 17, 2016.

List of IBM Patents or Patent Applications Treated as Related, Signed Oct. 30, 2017, 2 pages.

DISABLING A MOBILE DEVICE THAT HAS STOLEN HARDWARE COMPONENTS

BACKGROUND

This disclosure relates generally to mobile devices, and more specifically, to disabling a mobile device that has stolen hardware components.

Mobile devices, such as smart phones, have been the targets of a growing theft trend in recent years. For example, in 2013 a survey reported that 3.1 million United States consumers were the victims of smartphone theft, which is nearly double the number reported in 2012. Not only is data within mobile devices valuable to thieves (e.g., photographs, banking information, phone numbers, or other private information), but mobile devices may be valuable for the hardware components they contain (e.g., Random Access Memory (RAM), Bluetooth® device, memory card, CPU, Motherboard, etc.).

SUMMARY

One or more embodiments are directed to a computer-implemented method, a system, and a computer program product. Various embodiments are directed to a first hardware component identifier that may be read for a first hardware component of a computing device. The reading of the first hardware component identifier for the first hardware component may be performed by a processor of the computing device reading a read-only memory of the first hardware component. A second hardware component identifier and an alert indicator over a network may be received. The second hardware component identifier and the alert indicator may correspond with the first hardware component. The first hardware component identifier may be compared with the second hardware component identifier. The computing device may be disabled when the first hardware component identifier matches the second hardware component identifier and the alert indicator indicates that the first hardware component has been reported stolen.

Figure 1:
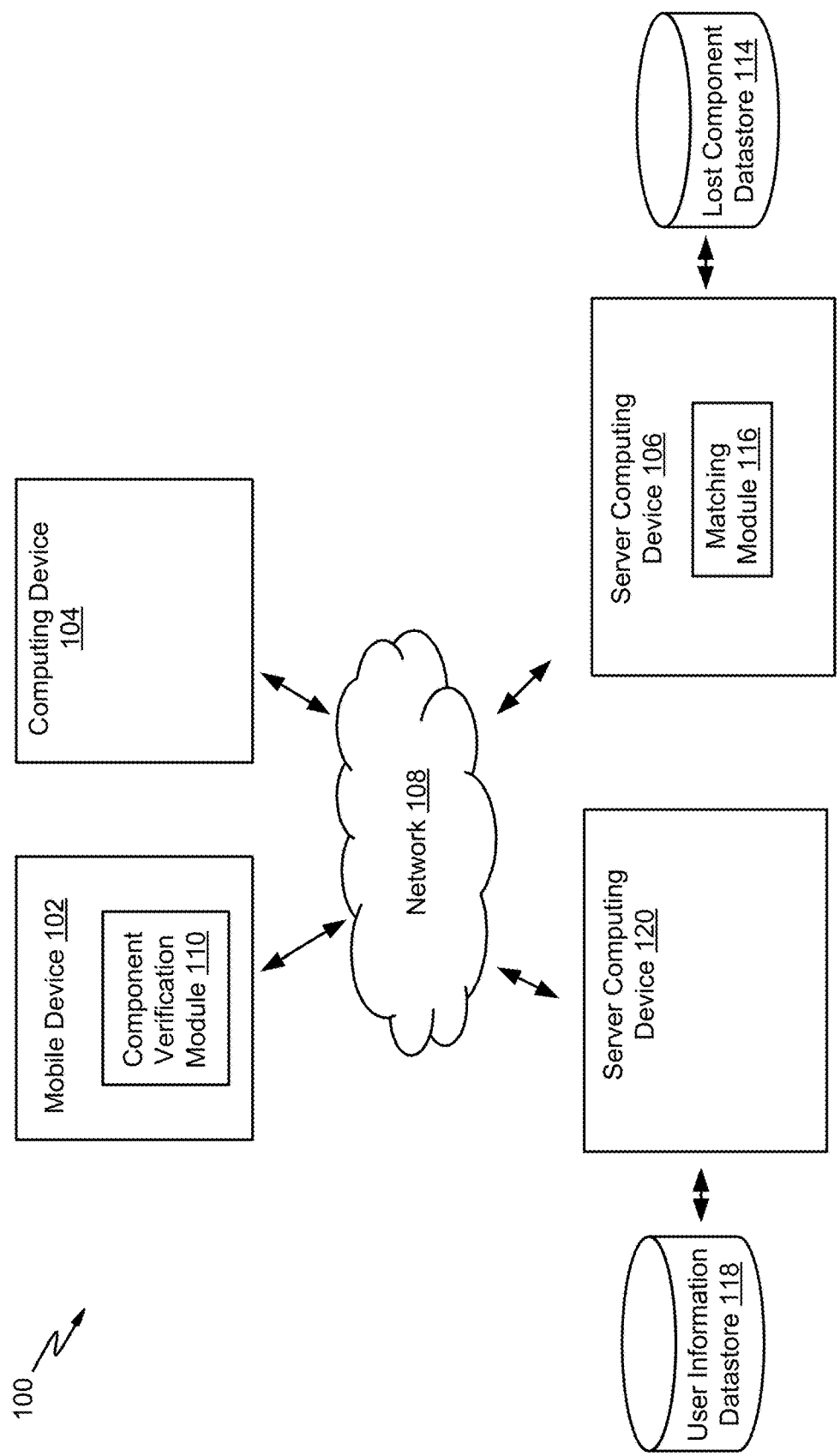
FIG. 1 is a block diagram of a computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to disabling or inactivating a mobile device that has stolen hardware components. While the present disclosure is not necessarily limited to such applications, various aspects of the disclosure may be appreciated through a discussion of various examples using this context.

Although a large quantity of people have may have had their mobile devices stolen in recent years, only a small percentage of them may actually recover their mobile devices. For example, a report found that 1 in 10 U.S. smartphone owners are victims of smartphone theft and only 68 percent of the victims were unable to recover their smartphone after the theft occurred. In order to remedy the smartphone theft problem, users may try to perform actions such as: send a remote "lock" command to lock a mobile device, track a mobile device via a unique identification number (e.g., an International Mobile Equipment Identity (IMEI) number) in order to blacklist the mobile device, remotely wipe data from the mobile device, utilize a "kill switch" in order to disable a mobile device, etc. However, as the report above may demonstrate, at least some of these measures may not completely remedy the smartphone theft epidemic.

Further, a thief or third party may sell/use the hardware components of a stolen mobile device regardless of whether the stolen mobile device itself has been inactivated in some way. For example, a clever person may not power up a mobile device knowing that this triggers particular security mechanisms (e.g., tracking information to locate a stolen smartphone) or that the mobile device itself may be unusable because of particular security mechanisms (e.g., a "lock" of a stolen smartphone). Instead, with the power off, the person may disassemble the mobile device, remove each hardware component, and sell the hardware components without any sort of detection or knowledge that this has occurred or what mobile device the stolen components are now embodied in. Accordingly, embodiments of the present disclosure are directed to inactivating a mobile device that has stolen hardware components, which may deter mobile device theft and make it easier to track a mobile device that has been stolen.

FIG. 1 is a block diagram of computing environment 100, according to embodiments. In some embodiments, the computing environment 100 may include a mobile device 102, a computing device 104, each of which are communicatively coupled (e.g., via the network 108) to one or more server computing devices (e.g., the server computing device 106 and/or the server computing device 120). The server computing device 106 may include the lost component datastore 114 (e.g., a database) and the server computing device 120 may include the user information database 118. In some embodiments, the computing environment 100 may be implemented within a cloud computing environment, or use one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 108.

Figure 2:
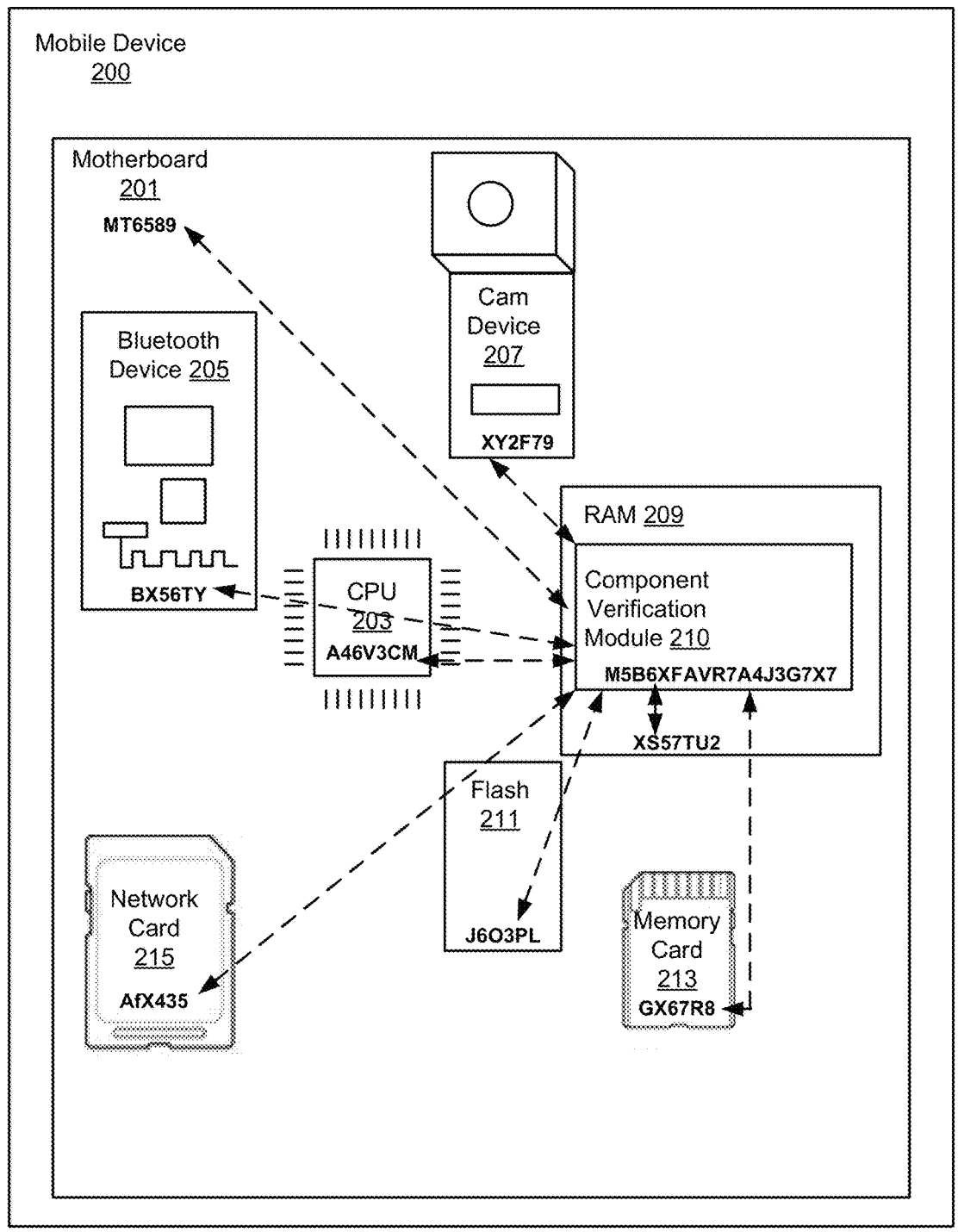
FIG. 2 is a block diagram of an example computing device and all of its hardware components, illustrating how each hardware component may be identified and how a mobile device identifier may be generated, according to embodiments.
Figure 8:
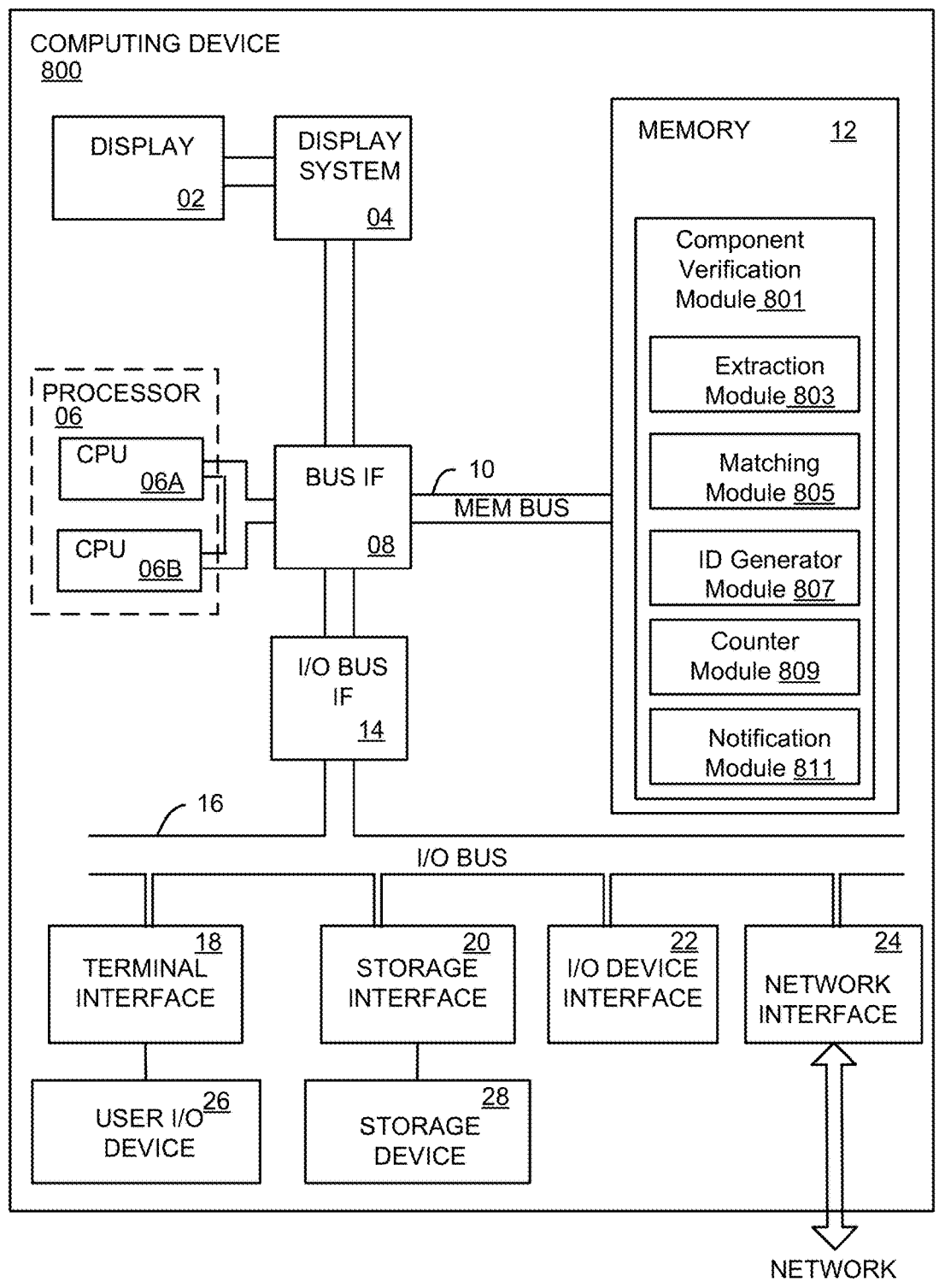
FIG. 8 is a block diagram of a computing device that includes a component verification module, according to embodiments.

Consistent with some embodiments, the mobile device 102, computing device 104, the server computing device 106 and/or the server computing device 120 may be configured the same or analogous to the computing device 800, as illustrated in FIG. 8 and/or the mobile device 200, as illustrated in FIG. 2. In some computing environments, more or fewer server computing devices, computing devices, or mobile devices may be present than illustrated in FIG. 1. For example, the computing environment 100 may include only one server computing device that is responsible for managing both the lost component datastore 114 and the user information datastore 116.

As illustrated in FIG. 1, the mobile device 102 may include a component verification module 110. In some embodiments, the component verification module 110 may be an application that extracts a set of (i.e., on or more of) identifiers (e.g., serial numbers) corresponding to a current identification of a set hardware components that are actually within the mobile device 102, herein after referred to as Dynamic Unique Serial Numbers (DUSNs) for that particular set (described in more detail below). The component verification module 110 may further be configured to call the server computing device 106, which determines (e.g., via the matching module 116) whether the set of hardware component identifiers are listed in the lost component datastore 114. In some embodiments, the matching module 116 is a database manager that is responsible for managing databases. As disclosed herein, an "identifier" may correspond to identification or indicia (e.g., alphanumeric text) to identify or describe a hardware component of a mobile device and/or the mobile device.

In some embodiments, the datastores 114 and/or 118 may represent individual servers (e.g., database servers) or a database management system utilized to process and access the actual data within a storage device (e.g., disk). The lost component datastore 114 may be a datastore that includes at least a first object field where data is input (e.g., by a user whose mobile device was stolen) to describe (e.g., via a set of hardware component identifiers) which, if any, hardware components of a mobile device have been lost/stolen. In some embodiments, the lost component datastore 114 also includes a second object field where data is input to describe which mobile devices have been lost/stolen. In some embodiments, the matching module 116 of the server computing device 106 may be a set of program instructions configured to determine whether a set of hardware component identifiers derived from the component verification module 110 match any of the hardware component identifiers listed in the lost component datastore 114, which is described in more detail below.

In some embodiments, the server computing device 120 (e.g., corresponding to a user's smartphone manufacturer/ provider website) may have access to a user information datastore 118, which may include a list of users associated with various mobile devices, an identifier of each mobile device (herein after referred to as Unique Device Number (UDN) (e.g., an IMEI), an identifier for each hardware component within each of the mobile devices (hereinafter referred to as a Unique Serial Number (USN), usernames, passwords, other authentication/authorization information, and/or any other information associated with a user of a particular mobile device 102. In some embodiments, the user information datastore 118 and the lost component datastore 114 may be the same datastore or include the same information such that there is only one datastore. Rather, for example, the datastores 118 and 114 may represent two different database tables within the same database. In some embodiments, each or both of the server computing devices 120 and/or 106 may be considered a server computer system.

In some embodiments, when a user first registers the mobile device 102, the user may be required to download the component verification module 110. The component verification module 110 may receive (e.g., from the user information datastore 118) a set of USNs (hardware component identifiers) that are listed within the user information datastore 118 datastore corresponding to particular hardware components as being within the mobile device 102. For example, when a user registers her smartphone, she may be required to register her email account, UDNs, USNs, etc., in order to have access to the mobile device 102. In some embodiments, each time an operating system of the mobile device 102 is loaded (i.e., is booted up), the USNs (among other information) may be transmitted from the user information datastore 118 to the component verification module 110 and the DUSNs within the mobile device are derived (e.g., via the component verification module 110) in order for the mobile device 102 to compare the DUSNs and the USNs, which is described in more detail below. This may be performed as a background task. A background task is a process that runs without user intervention/input.

The mobile device 102, computing device 104, and/or server computing device 106 may communicate with another via any suitable network 108. For example, the network 108 may be a local area network (LAN), a Wi-Fi (i.e., IEEE 802.11b) network, a cellular telephone network, a general wide area network (WAN), and/or a public network (e.g., the Internet).

The computing environment 100 illustrates that when a user loses his/her mobile device, he/she may log into the lost component datastore 114 to input identifiers of the mobile device and all of the hardware components in order to inactivate the mobile device that includes the lost hardware component(s). For example, a third party may steal the mobile device 102 from a rightful owner. The owner may then use the computing device 104 (e.g., a desktop computer) to log on to the server computing device 106 in order to input or list the mobile device 102 (i.e., the UDN) and all of its hardware components (i.e., the USNs) as stolen or lost. In the meantime, a thief may have taken a particular hardware component, component X out of the mobile device 102 and sold it to a third party. Whenever the third party builds a second mobile device Y with the lost component X and activates the mobile device Y, then the mobile device Y's component verification module may determine that there is a mismatch of hardware components. The third party's mobile device may then (e.g., via a component verification module) contact the lost component datastore 114 to determine whether the mobile device Y has any stolen hardware component. The matching module 116 may then determine that component X was listed as stolen and consequently send a message back to the mobile device Y, wherein the mobile device Y is disabled, locked, deactivated, etc. such that the third party may not use the mobile device Y, which is described in greater detail below.

FIG. 2 is a block diagram of an example mobile device and all of its hardware components, illustrating how each hardware component may be identified and how a mobile device identifier may be generated, according to embodiments. In some embodiments, the mobile device 200 may be the same or analogous to the mobile device 102 of FIG. 1. The mobile device 200 may include various hardware components, such as a motherboard 201, a Bluetooth® device 205, a camera device 207, one or more Central Processing Units (CPUs) 203, one or more Random Access Memory (RAM) devices 209, a network card 215, flash memory 211, and one or more memory cards 213 (e.g., a Secure Digital (SD) card, a Subscriber Identity Module (SIM) card, etc.). In various embodiments, the mobile device 200 includes more or less hardware components as illustrated in FIG. 2. For example, the mobile device 200 may include the hardware components illustrated in FIG. 8.

As illustrated in FIG. 2, each hardware component may include its own hardware component identifier (a DUSN). For example, the camera device 207 is identified by the alphanumeric text of "XY2F79," and the motherboard 201 is identified by the alphanumeric text of "MT 6589." The identifiers may include more or less characters and may utilize different symbols other than the letters and numbers illustrated in FIG. 2.

A processor may read/extract (via the component verification module 210/110) each of the DUSNs of each hardware component in order to identify the set of hardware components that are within the mobile device 200. In some embodiments, the component verification module 210 (including 110 and/or 810 of FIGS. 1 and 8 respectively) may be stored in read-only memory (ROM) such that computing device/component identifiers may always be stored and particular functions may be performed upon system boot up. For example, at boot up time (e.g., when the user powers a phone on), the component verification module 210 may automatically extract the identifier (the DUSN) of "XY2F79" from the camera device 207 in order to determine that the particular camera device 207 is within the mobile device 200. The component verification module 210 may perform the DUSN extraction in any suitable manner. For example, the component verification module 210 may include a Windows Management Instrumentation (WMI) engine in order to extract each hardware component's DUSN. In these embodiments, a developer may write WMI scripts or commands within the component verification module 210 in order for the scripts or commands to perform particular administrative tasks. For example, these scripts may cause the component verification module 210/processor to perform identifier extraction in an automated fashion. In an example illustration, a WMI script instruction to obtain DUSN of the RAM 209 may be: "wmic memory chip get serial number." In another example, a WMI script instruction to obtain a DUSN of the motherboard 201 may be, "wmic baseboard get serial number."

In some embodiments, as illustrated in FIG. 2, the component verification module 210 or other component generates the mobile device 200's identifier (herein referred to as the Dynamic Unique Device Number (DUDN)) using at least one character of each of the DUSNs via any suitable algorithm. A DUDN is a unique identification that identifies each mobile device as a whole, as opposed to each of a mobile device's hardware components. For example, as illustrated in FIG. 2, the mobile device's DUDN is M5B6XFAVR7A4J3G7X7. As illustrated in FIG. 2, this DUDN identifier is obtained by extracting each DUSN of each hardware component as described above and utilizing an algorithm that places the first and fourth character of each DUSN within the DUDN. Accordingly, the first and fourth character of the motherboard 201 DUSN is M5, the first and fourth character of the Bluetooth device 205 DUSN is B6, the first and fourth character of the camera device 207 DUSN is XF, the first and fourth character of the CPU 203 DUSN is AV, the first and fourth character of the RAM device 209 DUSN is R7, the first and fourth character of the network card 215 DUSN is A4, the first and fourth character of the flash memory device 211 DUSN is J3, the first and fourth character of the memory card 213 DUSN is G7, and the first and fourth character of the RAM 209 DUSN is X7. Each of the first and fourth characters of the DUSNs of each hardware component when taken together form the DUDN of M5B6XFAVR7A4J3G7X7.

In some embodiments, a server computing device (e.g., the server computing device 120 of FIG. 1) may also generate a mobile device identifier (i.e., a UDN) in order to compare (e.g., via the component verification module 210) the DUDN with the UDN, which is described in more detail below. For example, if an authorized user just purchased the mobile device 200, he or she may be required to register the mobile device 200, which includes downloading the component verification module 210. A server computing device may then generate a UDN using a first algorithm and transmit the UDN to the component verification module 120. The component verification module 210 may then generate a DUDN using the same first algorithm that the server computing device utilized to derive the UDN in order to determine whether the DUDN and UDN match, which is described in more detail below.

Figure 3:
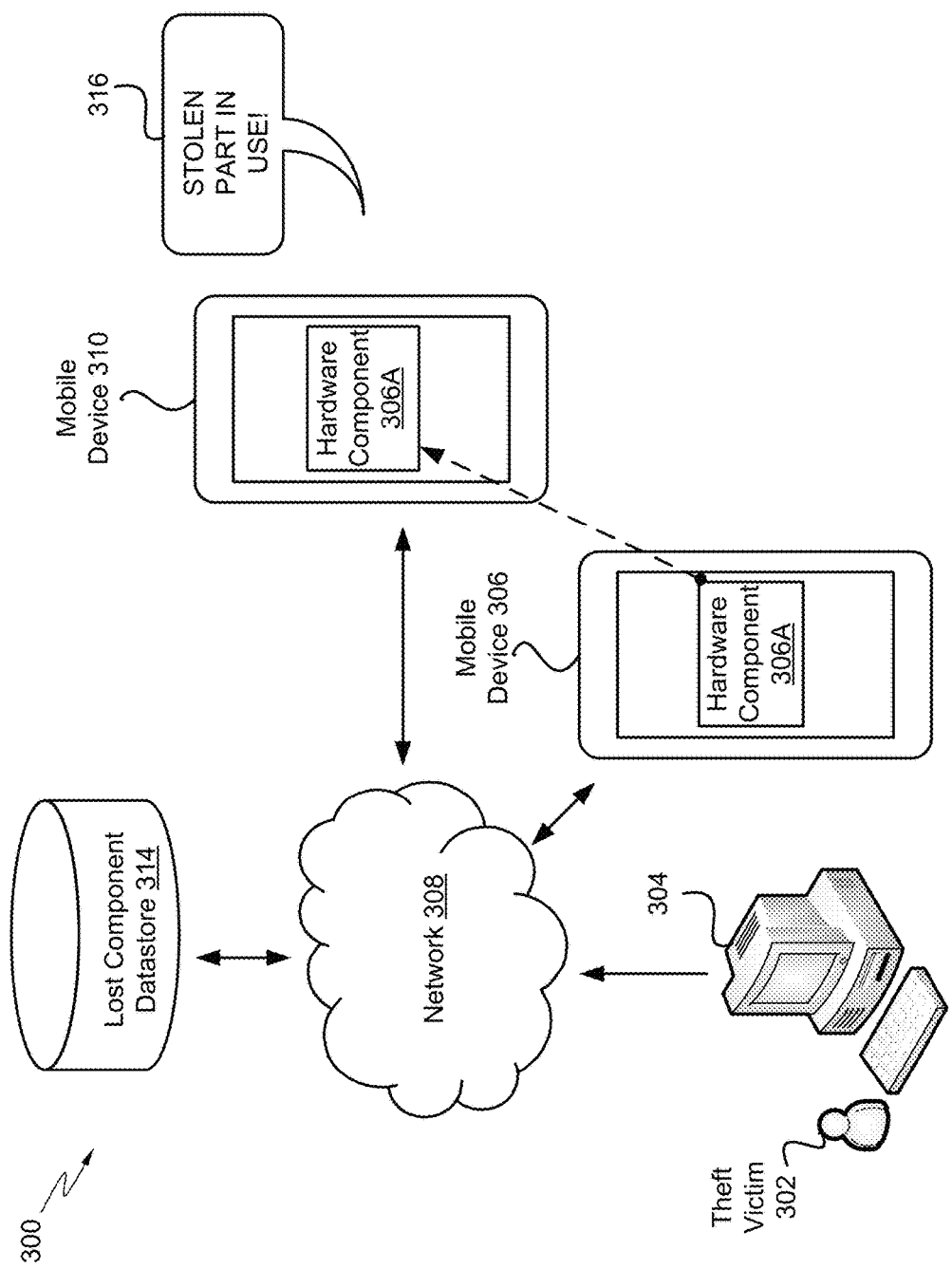
FIG. 3 is a block diagram of a computing environment illustrating how a mobile device is disabled when a component is listed as lost or stolen, according to embodiments.

FIG. 3 is a block diagram of a computing environment 300 illustrating how a mobile device is disabled when a component is listed as lost/stolen, according to embodiments. In some embodiments, the computing environment 300 may be the same or analogous to the computing environment 100 of FIG. 1 or include the same systems. For example, the lost component datastore 314 may be the lost component datastore 114 of FIG. 1. The computing device 304 may be the computing device 104 of FIG. 1, etc. The computing environment 300 includes a lost component datastore 314, a network 308, a theft victim 302, a computing device 304, a mobile device 306, and a mobile device 310. FIG. 3 illustrates that the hardware component 306A may have originally been located within the mobile device 306, but a person may have stolen the mobile device 306. The person may have further removed the hardware component 306A and sold it to a third party that is the owner of the mobile device 310. The third party may have assembled the component 306A into the mobile device 310.

FIG. 3 illustrates various steps that may occur when the theft victim 302 loses his mobile device (e.g., a smartphone). The theft victim 302, for example, may be the rightful owner of the mobile device 306 but a person may have stolen the mobile device 306. The theft victim 302 may then utilize the computing device 304 to establish a remote connection (e.g., a Transmission Control Protocol/Internet Protocol (TCP/IP) connection) via the network 308 with the lost component datastore 314 in order to log or generate a complaint to the lost component datastore 314 indicating that the theft victim 104's mobile device 306 and all of its hardware components have been lost/stolen. The complaint issued by the theft victim 302 may be stored to the lost component datastore 314 and may specify the particular USN of each hardware component (including hardware component 306A) and the UDN of the mobile device 306.

In some situations, the person does not necessarily have to remove hardware components (e.g., hardware component 306A) from the mobile device 306 in order to disable the mobile device 306. For example, a person (or some third party that the person sold the mobile device 306 to) may decide to use the stolen mobile device 306 for his or her pleasure. Accordingly, the person may power the mobile device 306 on to utilize applications installed on the mobile device 306. In some embodiments, as soon as the person powers the mobile device 306 on (e.g., when an operating system loads), a component verification module (e.g., the component verification module 210 of FIG. 2) having the UDN of the mobile device 306 and the USNs for each hardware component, may then contact the lost component datastore 314. Accordingly, for example, network 308 connection may be forced (e.g., automated) to be established between the mobile device 306 and the lost component datastore 314 (e.g., by the operating system of the mobile device 306 and as a background task), as opposed to giving a user the freedom to request a wireless connection by switching on a remote connection capability (e.g., a Wi-Fie switch on the mobile device 306). This may be useful because clever thieves may be careful not to switch on a network capability of the mobile device 306 knowing that there are security risks, such as the mobile device 306 connecting with some lost mobile device datastore and a resulting lock of the mobile device.

A forced or automated establishing of a connection via the network 308 may occur in any suitable manner. For example, when a user first powers his/her phone on, the phone may be locked (e.g., the user interface may be unusable) until the component verification module contacts the lost component datastore 314 and the lost component datastore 314 completes a search for lost/stolen parts and notifies the mobile device 306 and/or 310 that there are not lost/stolen hardware components. In some embodiments, using the illustration above, if there are lost/stolen hardware components found within the lost component datastore 314, the mobile device may continue to be locked. In some embodiments, the mobile device may not necessarily be locked, but the operating system, as a background task, may be configured to perform an automated switching on of a network capability (e.g., via a Wi-Fi control button) in order to contact the lost component datastore 314, as opposed to giving a clever thief an option to switch on a network capability. In these embodiments, the operating system may be configured to maintain a network capability even if a user tries to turn off the network capability. For example, a Wi-Fi capability control button may be configured to be switched on without user input on the user interface. In some embodiments, when a system responsible for searching within the lost component datastore 314 determines that no components are listed as lost/stolen, a message may be sent to the mobile device 306 and/or 310 indicating that no components are listed as lost/stolen. Consequently, the operating system of the mobile device 306 and/or 310 may turn off the network capability and give the user the option to turn the network capability on or off.

In some embodiments, the system responsible (e.g., server computing device 106) for searching the lost component datastore 314 may determine that the hardware component 306A's identifier (i.e., the USN of the hardware component 306A) is the exact hardware component identifier listed in the lost component datastore 314. Accordingly, the system that is responsible for the lost component datastore 314 may transmit a message to the mobile device 306A that a match was found, wherein the mobile device 306 is disabled or inhibited in some way such that the user interface may not be able to be utilized by the person who stole or anyone else.

In some situations, as illustrated in FIG. 3, the person who stole the mobile device 306 may not power the mobile device 306 on at all and/or may remove the hardware component 306A from the mobile device 306 to sell to a third party that owns the mobile device 310. In these situations, the third party may assemble the hardware component 306A into the mobile device 310. The third party may have been required to install a component verification module (e.g., the component verification module 210 of FIG. 2) at the time the third party was required to register the mobile device. Accordingly, when the third party powers the mobile device 310 on (e.g., an operating system is loaded), in some embodiments, the component verification module may extract the DUSNs of each hardware component (e.g., via WMI) and generate a DUDN. The mobile device 310 may then compare the DUDN with the UDN that is stored to the mobile device 310. In some embodiments, a server generates the UDN and transmits the UDN to the mobile device 310, as described above. When the mobile device 310 determines that there is a mismatch of the DUDN with the UDN (e.g., because of the component 306A that is now within the mobile device 310), the component verification module may then automatically establish a connection with the lost component datastore 314, without the user having to switch on a Wi-fi capability for example, as described above. The automatic establishment of a connection may be different than current measures in which a person or third party must turn on a wireless capability (e.g., Wi-Fi) switch of the mobile device in order for a datastore to be contacted. A clever thief may never turn on a wireless capability switch, realizing that his/her theft actions may be compromised. Every action up and until the establishing a connection to the lost component datastore 314 may be considered to be "offline" such that the component verification module may perform these operations with a wireless capability switch turned off. This may also be different than particular measures that require a remote datastore to perform analyses with a wireless capability (e.g., Wi-fi) switch turned on.

When it is determined that the component 306A's USN is located within the lost component datastore 314, the mobile device 310 in some embodiments may be disabled or inactivated in some way such that the user interface of the mobile device 310 may be unable to be utilized by the third party. In some embodiments, the mobile device 310 may provide or display the notification 316 (or alert indicator) that indicates that a stolen part(s) is in use. In some embodiments, the rightful owner's (e.g., the theft victim 302's) contact information may be provided (e.g., email address) within the notification 316. In some embodiments, the notification may specify that component 306A is the component that was stolen.

Figure 4:
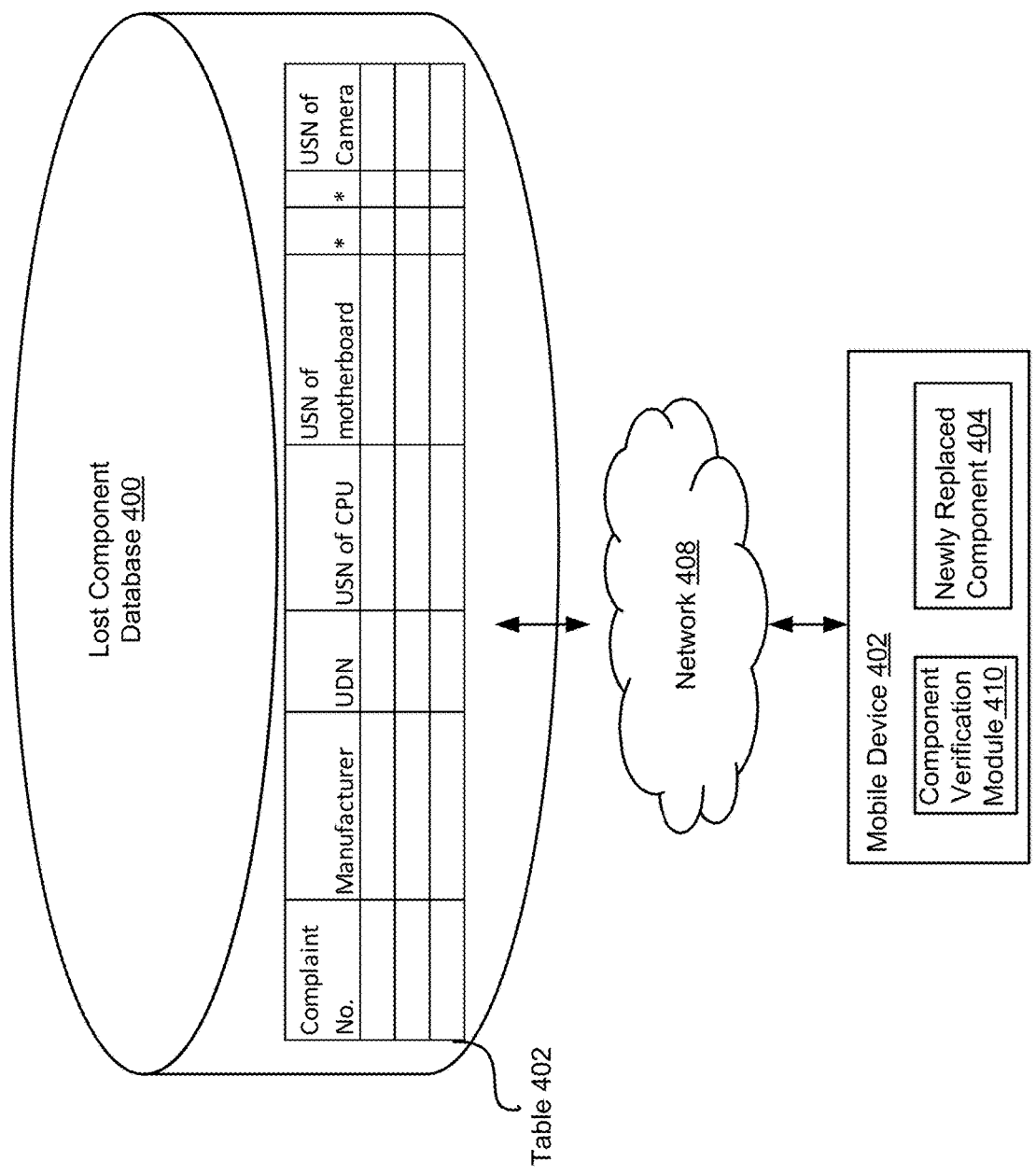
FIG. 4 is a block diagram illustrating what a lost component database table looks like and the process of installing a newly replaced component, according to embodiments.

FIG. 4 is a block diagram illustrating what a lost component database table looks like and the process of installing a newly a replaced component, according to embodiments. In some embodiments, the lost component database 400 is the same or analogous to the lost component datastores 114 and/or 314 of FIGS. 1 and 3 respectively and vice versa. In some embodiments, the mobile device 402 may also be configured analogous or the same as the mobile device 102 of FIG. 1, the mobile device 200 of FIG. 2, the mobile device 306 of FIG. 3 and/or the mobile device 310 of FIG. 3. Moreover, the network 408 may further be the same network as illustrated in FIG. 1 and/or FIG. 3.

In some embodiments, the lost component database 400 includes the table 402. The table 402 may be a data object that organizes a particular complaint from a user to report that a particular mobile device and its hardware components have been stolen or lost. The table 402 may include various fields such as a "complaint No." field, which may be a primary key column designed to differentiate each of the table 402 records (i.e., rows). For example, each complaint number record may correspond to a different user or mobile device (and its components) that has been lost. The table 402 may further include a "manufacturer" field, which is utilized to identify a particular manufacturer of a mobile device that was lost/stolen.

The table 402 may further include a UDN field, which is utilized to identify the UDN of the lost mobile device. In some situations, a user may not necessarily know the UDN (or USNs). In these embodiments, the system (e.g., server computing device 106 of FIG. 1) responsible for scanning the lost component database 400 may establish a remote connection to a server computing device (e.g., server computing device 120 of FIG. 1) that corresponds to the victim's mobile device manufacturer/provider in order to determine what the UDN (or USNs) are for the mobile device that is lost (e.g., via scanning the user information datastore 118). The table 402 may further include various USNs or hardware component identifiers of various hardware components. For example, the table 402 includes a "USN of CPU" field, a "USN of motherboard" field," a "USN of a camera" field, etc. More or less fields may be present than illustrated in the table 402. For example, the table 402 may include a "USN of RAM" field, a "USN of memory card field, a "USN of Bluetooth device" field, etc. In some embodiments, the table 402 or a table analogous to the table 402 may be the same table that is also within the lost component datastores 114, and/or 314 of FIGS. 1 and 3 respectively.

FIG. 4 illustrates that every time a hardware component is replaced and a mobile device boots up, the lost component database 400 may be contacted in order to determine whether any hardware components are stolen. For example, a user may simply need to replace a hardware component in his or her mobile device 402 with the newly replaced hardware component 404. After the user has assembled the newly replaced component 404 within the mobile device 402 and after the mobile device 402 has been powered on, the component verification module 410 may then receive (e.g., from the user information datastore 118 of FIG. 1) a UDN (e.g., via an automated network connection with a datastore) and generate a DUDN. When it is determined (e.g., via the component verification module 410) that there is a mismatch between the UDN and the DUDN generated, the mobile device 402 may automatically establish a remote connection (e.g., via the network 408) to the lost component database 400 regardless of whether the user has turned on/off a network capability (e.g., a Wi-Fi control button on the graphical user interface), as the mobile device 402 operating system may cause the network capability to be turned on and unable to be switched off for a particular duration of time (e.g., 5 minutes).

In some embodiments, after the mobile device 402 establishes a connection to the lost component database 400, the mobile device may send a message to the system of the lost component database 400 specifying the DUSNs of each hardware component it has extracted. The table 420 may then be searched (e.g., via the matching module 116 of FIG. 1) to determine whether, for example, the newly replaced component 404 identifier is within any of the USN fields (e.g., USN of CPU) of the table 402.

Figure 5:
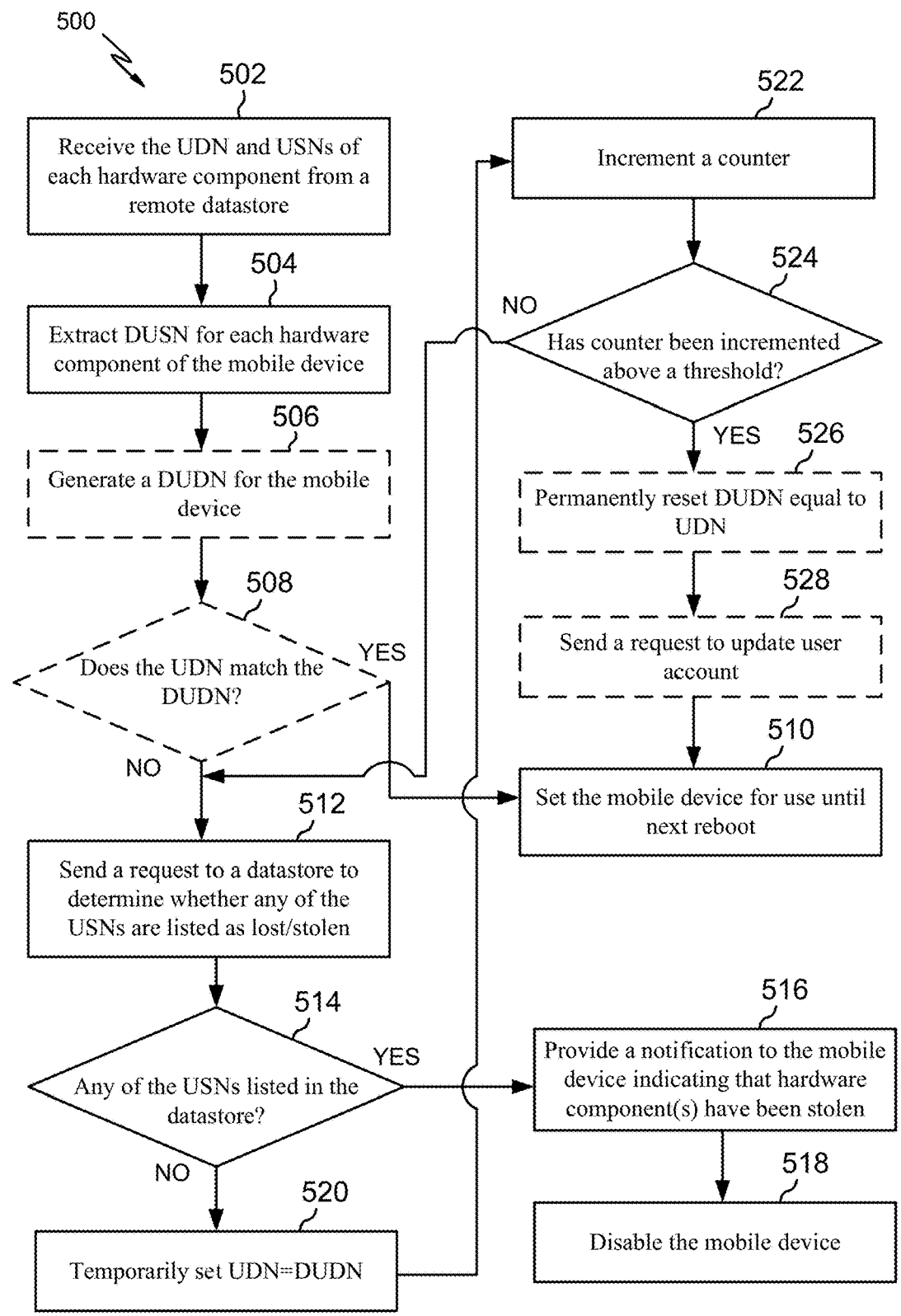
FIG. 5 is a flow diagram of an example process for inactivating a mobile device that includes hardware components listed as lost or stolen, according to embodiments.

FIG. 5 is a flow diagram of an example process for disabling a mobile device that includes (or does not include) hardware components listed as lost or stolen, according to embodiments. In some embodiments, the process 500 may begin when an operating system loads (i.e., is booted up) and/or a component verification module (e.g., the component verification module 210 of FIG. 2) is downloaded on a particular mobile device.

Per block 502, the mobile device may receive the UDN of the mobile device and USNs of each hardware component of the mobile device that are listed in a datastore (e.g., the user information datastore 118 of FIG. 1) as being within the mobile device. For example, when a user registers his/her smartphone on a provider website (e.g., corresponding to the server computing device 120 of FIG. 1), this account will have the USN of the various hardware components of the mobile device. In some embodiments, the provider web site may then generate a UDN using the USNs (e.g., via the algorithm specified in FIG. 2). In embodiments, when the user downloads the component verification module 110 for the first time, the UDN and USNs of the mobile device may then be transmitted from the provider website server computing device to the mobile device.

Per block 504, a component may then extract (e.g., via the component verification module of the mobile device) a DUSN for each hardware component of the mobile device corresponding to an identification of the set of hardware components that are actually within the mobile device. For example, referring back to FIG. 2, the component verification module 210 may extract, using WMI scripts, each of the hardware component identifiers (DUSNs) of the Bluetooth device 205, the camera device 207, the CPU 203, the RAM 209, the flash memory 211, the memory card 213 and the network card 215 (e.g., extracting the identifier AfX435 for the network card 215).

Per block 506, in some embodiments, a DUDN may then be generated (e.g., via the component verification module of the mobile device) for the mobile device, which corresponds to a current identification of a mobile device using a current identification (e.g., the DUSN) of each hardware component in the mobile device. For example, referring back to FIG. 2, the mobile device identifier of M5B6XFAVR7A4J3G7X7 may be generated utilizing an algorithm that generates the $1^{st}$ and $4^{th}$ character of every hardware component identifier (which may be the same algorithm utilized for obtaining the UDN and USNs of each hardware component). In some embodiments, block 506 may not be performed in the process 500.

Per block 508, in some embodiments it may be determined (e.g., via the component verification module of the mobile device) whether the UDN matches the DUDN to identify whether the set of hardware components that are listed in the remote datastore as being within the mobile device (corresponding to the USNs) are or match the set of hardware components that are within the mobile device (corresponding to the DUSNs). In some embodiments, the DUSN (or portion of the DUSN) obtained for each hardware component may be compared to the USN (or portion of the USN) obtained for each hardware component instead of or in addition to determining whether the UDN matches the DUDN. For example, the component verification module of the mobile device may determine whether the set of hardware components that are listed in the remote datastore as being within the mobile device (i.e., the USN of each hardware component) match the set of hardware components that are actually within the mobile device (i.e., the DUSN of each hardware component) by comparing at least a first portion of the USNs with at least a second portion of the DUSNs. For example, referring back to FIG. 2, the DUSN extracted from the Bluetooth device 205 may be BX56TY. The entire DUSN or particular characters, such as the first and last character (BY), the first three characters (BX5), etc. may be compared to the USN or portion of the USN respectively.

If the UDN matches the DUDN (or the DUSNs match the USNs or portion thereof), this may indicate that the set of hardware components that are listed in the remote datastore as being within the mobile device match or are the set of hardware components that are actually within the mobile device. Accordingly, per block 510, the mobile device may be set for use (e.g., the component verification module within the mobile device stops functioning until the next reboot).

Per block 512, if the UDN does not match the DUDN (or the DUSNs do not match the USNs or any portion thereof), a request may be sent (e.g., via the component verification module) to a remote datastore (e.g., the lost component datastore 114 of FIG. 1) to determine whether any of the USNs (or DUSNs) are listed in the remote datastore corresponding to any of the hardware components being lost or stolen. For example, the component verification module in the mobile device may transmit a message to the remote datastore specifying that hardware component XY456 is lost. The system controlling the datastore (e.g., the matching module 116 of FIG. 1), or any other component may then determine, per block 514 whether any of the USNs (or DUSNs) are listed in the remote datastore. For example, each of the USN fields of the table 402 of FIG. 4 may be scanned to determine whether any of the USNs received in the message match any of the USNs within the remote datastore.

If any of the USNs are listed in the remote datastore as lost/stolen, then a system of the remote datastore (e.g., the server computing device 106) may then transmit a message that the mobile device receives indicating that one or more of the USNs are listed in the remote datastore as being lost/stolen. Per block 516, a notification or alert indicator (e.g., the notification 316 of FIG. 3) may then be provided (e.g., via the server computing device 106 or the mobile device) to the mobile device indicating that one or more hardware components have been stolen.

Per block 518, the mobile device may then be inactivated/disabled (e.g., via an operating system of the mobile device) such that a user interface of the mobile device may be unusable or the user cannot perform an operation to or from the mobile device. For example, the mobile device may be locked, a kill switch may be activated, an actual circuit switch of the lost hardware component(s) may be opened such that the particular stolen hardware component stops functioning. For example, a transceiver may be coupled to each hardware component and may continually send broadcasts to the system of the remote datastore that specifies the identifier of the hardware component (i.e., the USN). Upon receiving information that the identifier matches an identifier listed in a lost component datastore, the system of the remote datastore may send a message to the mobile device to open the hardware component switch to make it stop functioning.

Per block 520, if none of the USNs (or DUSNs) are listed in the remote datastore as lost/stolen, then the UDN may be temporarily set (e.g., via the component verification module) equal to the DUDN. For example, an authorized user of the mobile device may simply be replacing a component in his/her phone and even though the UDN does not match the DUDN, the UDN should be temporarily be the DUPN because of authorized use. In another example, a user may not have had enough time to log a complaint to the remote datastore and so the UPN may be temporarily set to the DUPN to give the user more time to log the complaint.

Per block 522, each time the UDN is temporarily set to the DUDN, each time the remote datastore has been scanned, and/or each time a mobile device receives a message from the remote datastore indicating that no match has been found, a counter may be incremented (e.g., via the component verification module) to assess a quantity of intervals that have passed before the DUDN is permanently set to the UDN (block 526). For example, after the UDN is temporarily set to the DUDN for the first time, a counter may be incremented (e.g., 1), after scanning the remote datastore again at a second time to determine whether any of the USNs are listed as lost stolen, the counter may be incremented again (e.g., 2), etc.

Per block 524, it may be determined (e.g., via the component verification module) whether the counter quantity has been incremented above a threshold. For example, using the illustration above, the counter quantity/count threshold may be 3 or more counts, and the counter may be at 2. Accordingly, if the counter quantity has not exceeded the threshold, then block 512 may be repeated in some embodiments once again to send a request to a remote datastore, which determines whether a user has logged a complaint yet (i.e., whether any of the USNs are listed as stolen/lost).

Per block 526, if the counter quantity has been incremented above a threshold (e.g., the counter is now at 3), then the DUDN may be permanently reset/changed (e.g., via the component verification module) to the UDN. For example, the UDN that was received in block 502 may be deleted by the mobile device and the mobile device may now store and recognize the DUDN as the new UDN. In some embodiments, however, the counter quantity may never be incremented above a threshold such that the user may have an infinite amount of time to log a complaint.

Per block 528, in some embodiments, once the DUDN has been set equal to the UDN, a user account may be updated. For example, the mobile device may send a request to a server computing device (e.g., the server computing device 120 of FIG. 1) to update the UDN to the DUDN and each of the USNs (e.g., within the user information datastore 118 of FIG. 1). Per block 510, the mobile device may then be set for use until the operating system loads again, as described above.

In some embodiments, the process 500 or an analogous process may be represented by the following pseudocode sequence:

```
STEP 1: START
STEP 2: Input: For every "Phone - Restart/Reboot"
        Generate Dynamic UDN for phone using same algorithm as
        UDN.
        If UDN == DUDN
            Phone for use; Exit;
        Else
            Identify mis-matched part.
            Search_Database (mis-matched part);
            If ("match_found"?)
                Warning -- "STOLEN Part(s) IN USE!"
                Search_Database (All other parts);
                Block Phone; Exit;
            Else
                Phone for use;
                Check_counter=0;
                UDN = DUDN;
                Go to STEP 3;
STEP 3: Check_counter++;
STEP 4: While check_counter < 3,
        For interval of 'X' days GOTO STEP2
```

-continued

```
STEP 5: While check_counter == 3,
        Re-set UDN = DUDN;
        Update in user account.
        Make UDN as reference UDN for the device;
        Exit;
STEP 6: FINISH
```

Figure 6:
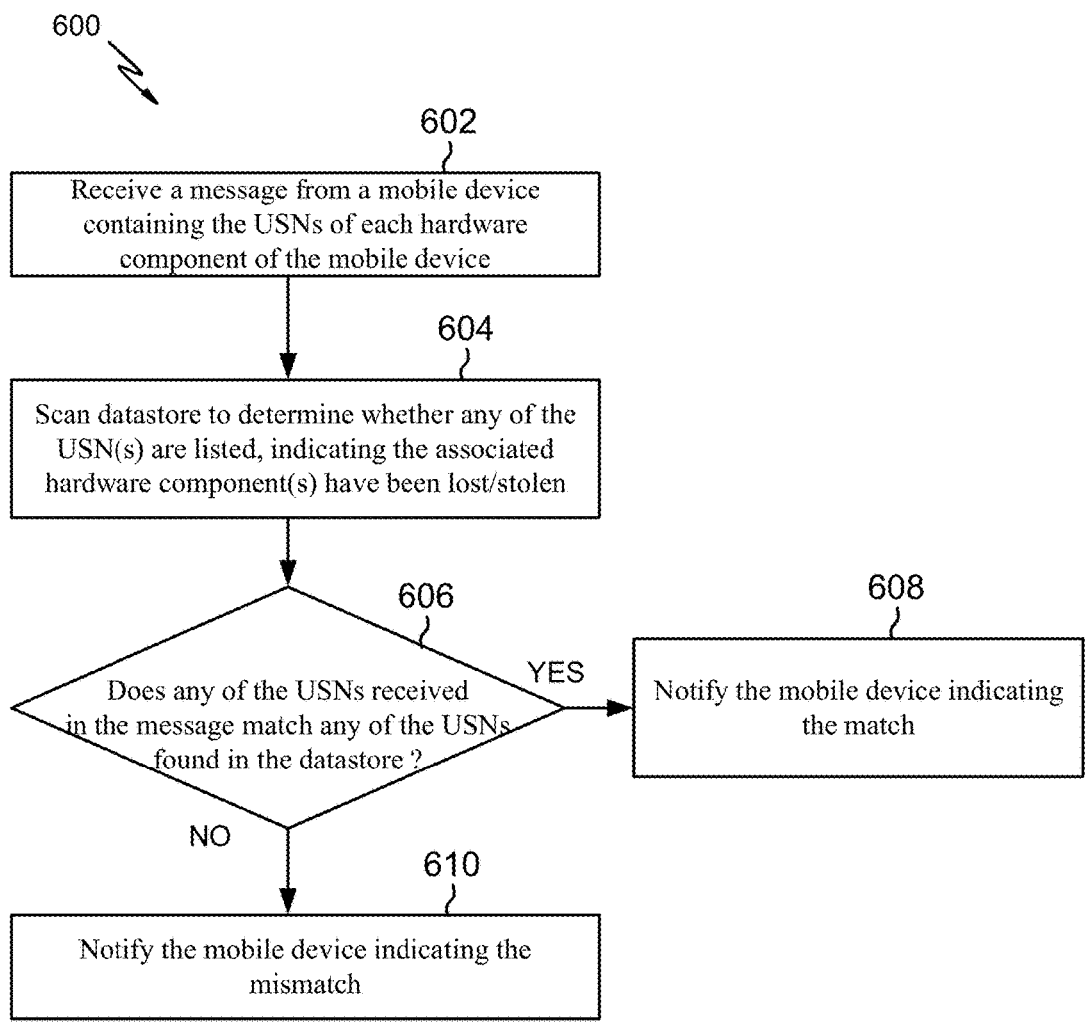
FIG. 6 is a flow diagram of an example process for determining whether one or more hardware components logged in a user complaint matches any hardware component identifiers received from a mobile device, according to embodiments.

FIG. 6 is a flow diagram of an example process 600 for determining whether one or more hardware components logged in a user complaint matches any hardware component identifiers received from a mobile device, according to embodiments. The process 600 in some embodiments begins at block 602 when a message is received (e.g., by the server computing device 106 of FIG. 1) from a mobile device, containing the USNs of each hardware component of the mobile device. For example, after the mobile device determines that the DUDN and the UDN do not match (e.g., block 508 of FIG. 5), the mobile device may then send a request to a remote datastore (e.g., block 512 of FIG. 5), wherein the system that is associated with the datastore (e.g., lost component datastore 114) scans, per block 604, the datastore to determine whether any of the USN(s) received in the message are listed. Any of the USN(s) that are listed may indicate that the associated hardware component(s) have been lost/stolen.

Per block 606 it may be determined (e.g., via the matching module 116 of FIG. 1) whether any of the USNs received in the message match any of the USNs found in the datastore. Per block 608, if one or more of the USNs received in the message matches any of the USNs found in the datastore then this may indicate that the one or more hardware components within the mobile device have been stolen. Accordingly, a notification or alert indicator may be sent (e.g., by the server computing device 106) to the mobile device (e.g., mobile device 102 of FIG. 1) indicating the match or that one or more hardware components have been reported stolen. Per block 610, if none of the USNs received in the message match any of the USN found in the datastore (or if there are no USNs found in the datastore) then a notification or alert indicator may be sent to the mobile device indicating a mismatch or that none of the hardware components have been reported stolen/lost.

In some embodiments, the process 600 or an analogous process may be represented by the following pseudocode sequence:

```
STEP 1: START
STEP 2: Database: User log in complaint. UDN and USNs.
STEP 3: Input: mis-matched part's USN
STEP 4: If element found
        Return "match_found" to App( ). Go to STEP 5.
    Else
        Return "no_match" to App( );
STEP 5: Collect all other parts from App.
STEP 6: Run scan on ALL parts.
STEP 7: Send out Msgs to Matching parts Victim's Contact number.
STEP 8: Finish
```

Figure 7:
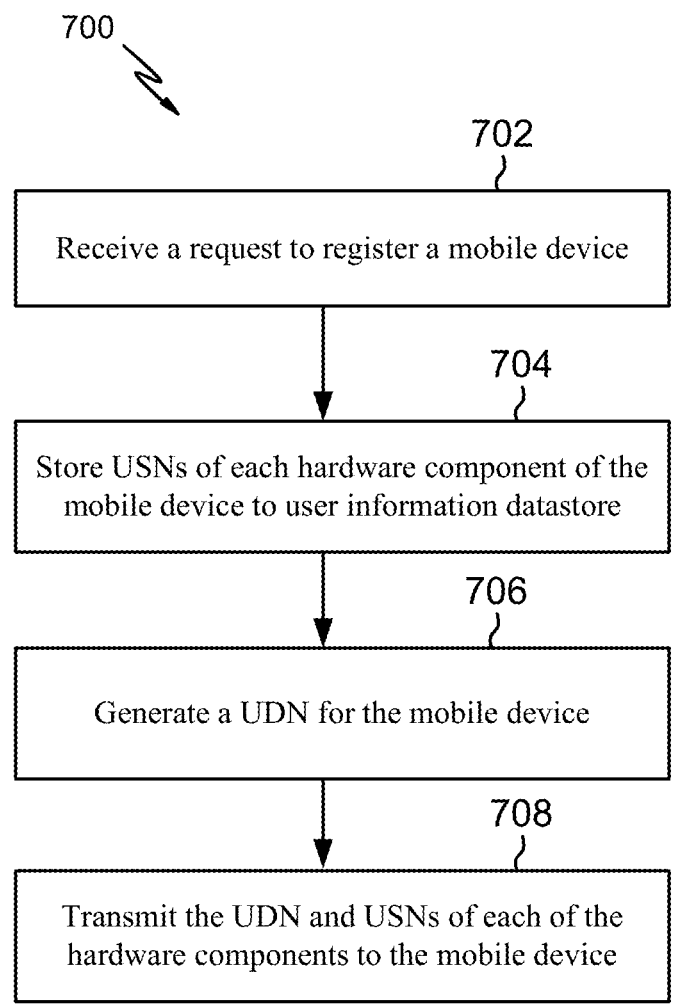
FIG. 7 is a flow diagram of an example process for receiving a user request to register a mobile device and generating a reference Unique Device Number (UDN) for a mobile device.

FIG. 7 is a flow diagram of an example process 700 for receiving a user request to register a mobile device and generating a reference UDN. In some embodiments, the process 700 may begin at block 702 when a request is received (e.g., by the server computing device 120 of FIG. 1) to register a mobile device (e.g., the mobile device 102 of FIG. 1). For example, the mobile device manufacturer may be associated with a server computing device and website that receives a user request to register the mobile device. Registration may include inputting user name, email, UDN, USNs of each hardware component, etc.

Per block 704, the USNs of each hardware component of the mobile device may be stored to a user information datastore (e.g., the user information datastore 118 of FIG. 1). The USNs may be provided by the user themselves or by the manufacturer.

Per block 706, A UDN may be generated (e.g., by the server computing device 120 of FIG. 1) for the mobile device. For example, analogous to FIG. 2, a server computing device that corresponds to a mobile device manufacturer may include software that utilizes WMI commands to extract each of the USNs of the mobile device and generate a UDN using the algorithm specified in FIG. 2.

Per block 708, the UDN and USNs of each of the hardware components may be transmitted (e.g., by the server computing device 120 of FIG. 1) to the mobile device such that the mobile device may have baseline identifiers to compare against its own generated DUDN and DUSNs, as described above.

In some embodiments, the process 700 or an analogous process may be represented by the following pseudocode sequence:

STEP 1: START
STEP 2: Input: Register in the manufacturers website providing the IMEI details.
STEP 3: Account contains the Unique Serial Number (USN) of parts of the device.
STEP 4: A reference Unique Device Number (UDN), generated for the Device using USNs.
STEP 5: FINISH FIG. 8 is a block diagram of a computing device 800 that includes a component verification module, according to embodiments. According to various embodiments, the computing device 800 can represent a mobile computing device (e.g., mobile device 102 of FIG. 1), a server computing device (e.g., the server computing device 106 of FIG. 1), or any other computing device (e.g., the desktop computer 304 of FIG. 3). The components of the computing device 800 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The computing device 800 may include one or more general-purpose programmable central processing units (CPUs) 06A and 06B, herein generically referred to as the processor 06. In an embodiment, the computing device 800 may contain multiple processors; however, in another embodiment, the computing device 800 may alternatively be a single CPU device. Each processor 06 executes instructions stored in the memory 12 (e.g., the component verification module 801).

The computing device 800 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 800, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The storage devices 28 may be employed to store any of the datastores described herein, including datastores 118, 114, 314, and/or 400. The I/O device interface 22 provides an interface to any of various other I/O devices or devices of other types, such as printers or fax machines. The network interface 24 provides one or more communication paths from the computing device 800 to other digital devices and computer systems (e.g., via Wi-Fi network, a cellular network, etc.).

Although the computing device 800 shown in FIG. 5 illustrates a particular bus structure providing a direct communication path among the processors 06, the memory 12, the bus interface 08, the display system 04, and the I/O bus interface unit 14, in alternative embodiments the computing device 800 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 800, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 800 is a multi-user mainframe computer system, a single-user system, or a server computer or similar device that has little or no direct user interface, but receives requests from other computer systems (clients). In other embodiments, the computing device 800 may be implemented as a desktop computer, portable computer, laptop or notebook computer, tablet computer, pocket computer, telephone, smart phone, or any other suitable type of electronic device. The computing device 800 may be any of the compute nodes 102, 104, and/or 106 of FIG. 1.

In various embodiments, the "mobile device" as described herein may refer to a computing device that is not constrained in its location like a desktop or data center is. Mobile devices may be portable or easily moveable and establish wireless connections (e.g., TCP/IP) to other devices without having to be connected via a fixed physical link (e.g., a wire). Examples of mobile devices include a smart phone, portable computer, a handheld computing device, a laptop or notebook computing device, a tablet computing device, a pocket computing device, a smart television, and/or any other suitable type of mobile electronic computing device. Operating systems or platforms associated with the mobile devices may include any suitable operating system or platform such as: ANDROID, I-PHONE OPERATING SYSTEM (iOS), WINDOWS PHONE 7 (WP7), etc.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 800, and may also include the virtual memory of other computer systems coupled to the computing device 800 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data (e.g., the component verification module 801) shown in FIG. 8. These programs and data are illustrated in FIG. 8 as being included within the memory 12 in the computing device 800; however, in other embodiments, some or all of them may be on different computer systems and may be accessed remotely, e.g., via a network 30. The computing device 800 may use virtual addressing mechanisms that allow the programs of the computing device 800 to behave as if they only have access to a large, single storage entity instead of access to multiple, smaller storage entities. Thus, while the components and data shown in FIG. 8 are illustrated as being included within the memory 12, these components and data are not necessarily all completely contained in the same storage device at the same time. Although the components and data shown in FIG. 8 are illustrated as being separate entities, in other embodiments some of them, portions of some of them, or all of them may be packaged together.

In some embodiments, the components and data shown in FIG. 8 (e.g., the component verification module 801) may include instructions or statements that execute on the processor 06 or instructions or statements that are interpreted by instructions or statements that execute on the processor 06 to carry out the functions as described above. In another embodiment, the components shown in FIG. 8 may be implemented in hardware via semiconductor devices, chips, logical gates, circuits, circuit cards, and/or other physical hardware devices in lieu of, or in addition to, a processor-based system.

In various embodiments the component verification module 801 may be identical or analogous as the component verification module 110 of FIG. 1, the component verification module 210 of FIG. 2, the component verification module 410 of FIG. 4, and/or the component verification module discussed in the processes 500, 600, and 700. In some embodiments, the component verification module 801 may include an extraction module 803, a matching module 805, an ID generator module 807, a counter module 809, and/or a notification module 811. In some embodiments more modules may be included. In some embodiments, some of these modules may be separate modules or programs such that they are not a part of the component verification module 801.

The extraction module 803 may be configured to extract a DUSN for each hardware component of a mobile device as described above. The matching module 805 may be configured to determine whether the UDN and the DUDN match, as described above. The ID generator module 807 may be configured to generate a DUDN for a mobile device, as described above. The counter module 809 may be configured to increment a counter, as described above. The notification module 811 may be configured to provide (e.g., display) a notification to the mobile device when there are one or more hardware components that have been found to have been listed in a datastore (e.g., the lost component datastore 114 of FIG. 1) of lost hardware components, as described above.

FIG. 8 is intended to depict representative components of the computing device 800. Individual components, however, may have greater complexity than represented in FIG. 8. In FIG. 8, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 8 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacturer including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   reading a first hardware component identifier for a first hardware component of a computing device, the reading of the first hardware component identifier for the first hardware component being performed by a processor of the computing device reading a read-only memory of the first hardware component;
   receiving, by the computing device, a second hardware component identifier and an alert indicator over a network, the second hardware component identifier and the alert indicator corresponding with the first hardware component;
   comparing, by the computing device, the first hardware component identifier with the second hardware component identifier;
   transmitting a first request to a computer system to check whether the first hardware component is listed as stolen; and
   disabling the computing device in response to the first hardware component identifier matching the second hardware component identifier and the alert indicator indicates that the first hardware component has been reported stolen.

2. The method of claim 1, further comprising transmitting a request for the second hardware component identifier and the alert indicator over the network to a server computer system, the server computer system having a datastore of hardware components having been reported stolen, wherein the transmitting of the request for the second hardware component identifier and the alert indicator are performed automatically without a user request and as a background task upon system boot up.

3. The method of claim 1, further comprising:
   reading a plurality hardware component identifiers for a plurality of hardware components of the computing device;
   receiving, via the network, a third identifier corresponding to an identification of the computing device; and
   generating, by using at least one character of each of the plurality of hardware component identifiers, a fourth identifier corresponding to the identification of the computing device.

4. The method of claim 3, further comprising;
   determining, by comparing the third identifier with the fourth identifier, that the fourth identifier does not match the third identifier; and
   transmitting, in response to the determining that the fourth identifier does not match the third identifier, a second request to a server computer system to check whether any of the plurality of hardware components are listed as stolen, wherein the transmitting of the request is performed automatically without a user request and as a background task upon system boot up, wherein the second request includes the first request.

5. The method of claim 4, further comprising:
   receiving, from the server computer system, a message via the alert indicator indicating that one or more of the plurality of hardware components are listed as stolen; and
   disabling the computing device, wherein a user cannot perform an operation to or from the computing device.

6. The method of claim 4, further comprising:
   receiving, from the server computer system, a first message via the alert indicator indicating that none of the plurality of hardware components are listed as stolen; and
   incrementing a counter to a first quantity based on the receiving the first message indicating that none of the plurality of hardware components are listed as stolen.

7. The method of claim 6, further comprising:
   transmitting, subsequent to the incrementing of the counter, a second request to the server computer system to check whether any of the plurality of hardware components are listed as stolen, wherein the transmitting of the second request is performed automatically without a user request and as a background task upon system boot up;

receiving a second message indicating that none of the plurality of hardware components are listed as stolen;

incrementing the counter to a second quantity based on the receiving of the second message indicating that none of the plurality of hardware components are listed as stolen;

determining that the second quantity exceeds a threshold; and changing, in response to the determining that the second quantity exceeds a threshold, the third identifier to the fourth identifier.

8. A system comprising:

a computing device having a processor; and a computer readable storage medium having program instructions embodied therewith, the program instructions readable/executable by the processor to cause the system to perform a method, the method comprising:

establishing an automated wireless connection, via a network and without a user request, between the computing device and a datastore, the datastore being remote to the computing device;

receiving, via the network, a first set of identifiers corresponding to an identification of a set of hardware components that are listed in a datastore as being within the computing device;

extracting, from the computing device, a second set of identifiers corresponding to an identification of a set of hardware components that are within the computing device;

determining, by comparing at least a first portion of the first set of identifiers with at least a second portion of the second set of identifiers, whether the set of hardware components that are listed in the datastore as being within the computing device match the set of hardware components that are within the computing device;

receiving a first message indicating that none of the second set of identifiers are listed in the datastore corresponding to the set of hardware components being stolen incrementing a counter to a first quantity based on receiving of the first message; and changing, in response to the incrementing of the counter, the first set of identifiers to another set of identifiers.

9. The system of claim 8, the method further comprising:

receiving, via the network, a third identifier corresponding to an identification of the computing device;

generating, by using at least one character of each of the second set of identifiers, a fourth identifier corresponding to the identification of the computing device; and comparing the third identifier with the fourth identifier, wherein the comparing the third identifier with the fourth identifier includes the comparing at least a first portion of the first set of identifiers with at least a second portion of the second set of identifiers.

10. The system of claim 8, the method further comprising:

determining that the a second set of hardware components that are listed in the datastore as being within a second computing device do not match a particular set of hardware components that are within the computing device; and sending, to the datastore, a request to determine whether any set of identifiers are listed in the datastore corresponding to the set of hardware components being stolen.

11. The system of claim 10, the method further comprising:

receiving a message indicating that one or more of the any set of identifiers are listed in the datastore;

providing, based on the one or more of the any set of identifiers being listed in the datastore, a notification indicating that one or more of the second set of hardware components have been stolen; and disabling the second computing device, wherein a user cannot perform an operation to or from the second computing device.

12. The system of claim 8, the method further comprising:

determining that the set of hardware components that are listed in the datastore as being within the computing device do not match the set of hardware components that are within the computing device;

sending, at a first time and to the datastore, a first request to determine whether any of the second set of identifiers are listed in the datastore corresponding to the set of hardware components being stolen; and receiving, in response to the sending, the first message indicating that none of the second set of identifiers are listed in the datastore corresponding to the set of hardware components being stolen.

13. The system of claim 12, the method further comprising:

receiving a second message indicating that none of the second set of identifiers are listed in the datastore corresponding to the set of hardware components being stolen;

incrementing the counter to a second quantity based on the receiving the second message indicating that none of the second set of identifiers are listed in the datastore;

determining that the second quantity exceeds a threshold; and changing, in response to the determining that the second quantity exceeds a threshold, the first set of identifiers to the second set of identifiers.

14. The system of claim 8, the method further comprising determining that the set of hardware components that are listed in the datastore as being within the computing device match the set of hardware components that are within the computing device.

15. A computer program product comprising a computer readable storage medium having program code embodied therewith, the program code executable by a computing device to:

read a first hardware component identifier for a first hardware component of the computing device, the reading of the first hardware component identifier for the first hardware component being performed by a processor of the computing device reading a read-only memory of the first hardware component;

receive a second hardware component identifier and an alert indicator over a network, the second hardware component identifier and the alert indicator corresponding with the first hardware component;

compare the first hardware component identifier with the second hardware component identifier;

transmit a request for the second hardware component identifier and the alert indicator over the network to a server computer system, the server computer system having a datastore of hardware components having been reported stolen; and disable the computing device when the first hardware component identifier matches the second hardware component identifier and the alert indicator indicates that the first hardware component has been reported stolen.

16. The computer program product of claim 15, wherein the transmitting of the request for the second hardware component identifier and the alert indicator are performed automatically without a user request and as a background task upon system boot up.

17. The computer program product of claim 15, wherein the program code is further executable by the computing device to:

read a plurality hardware component identifiers for a plurality of hardware components of the computing device;

receive, via the network, a third identifier corresponding to an identification of the computing device; and generate, by using at least one character of each of the plurality of hardware component identifiers, a fourth identifier corresponding to the identification of the computing device.

18. The computer program product of claim 17, wherein the program code is further executable by the computing device to:

determining, by comparing the third identifier with the fourth identifier, that the fourth identifier does not match the third identifier; and transmitting, in response to the determining that the fourth identifier does not match the third identifier, a first request to a server computer system to check whether any of the plurality of hardware components are listed as stolen, wherein the transmitting of the request is performed automatically without a user request and as a background task upon system boot up.

19. The computer program product of claim 18, wherein the program code is further executable by the computing device to:

receive, from the server computer system, a message via the alert indicator indicating that one or more of the plurality of hardware components are listed as stolen; and disable the computing device, wherein a user cannot perform an operation to or from the computing device.

20. The computer program product of claim 18, wherein the program code is further executable by the computing device to:

receive from the server computer system, a first message via the alert indicator indicating that none of the plurality of hardware components are listed as stolen;

increment a counter to a first quantity based on the receiving the first message indicating that none of the plurality of hardware components are listed as stolen;

transmit, subsequent to the incrementing of the counter, a second request to the server computer system to check whether any of the plurality of hardware components are listed as stolen, wherein the transmitting of the second request is performed automatically without a user request and as a background task upon system boot up;

receive a second message indicating that none of the plurality of hardware components are listed as stolen;

increment the counter to a second quantity based on the receiving of the second message indicating that none of the plurality of hardware components are listed as stolen;

determine that the second quantity exceeds a threshold; and send, in response to the determining that the second quantity exceeds a threshold, a request to the server computer system to change the third identifier to the fourth identifier.

* * * * *